(12) United States Patent
Beneker et al.

(10) Patent No.: US 7,722,006 B2
(45) Date of Patent: May 25, 2010

(54) CATCH DEVICE OF A LENGTHWISE ADJUSTMENT MECHANISM OF A MOTOR VEHICLE SEAT WITH TWO PAIRS OF RAILS

(75) Inventors: Wilfried Beneker, Leichlingen (DE); Burkhard Becker, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 709 days.

(21) Appl. No.: 11/588,630

(22) Filed: Oct. 27, 2006

(65) Prior Publication Data

US 2007/0095596 A1 May 3, 2007

(30) Foreign Application Priority Data

Oct. 27, 2005 (DE) .................. 10 2005 051 726

(51) Int. Cl.
*F16M 13/00* (2006.01)

(52) U.S. Cl. .............. 248/424; 248/429; 248/430; 297/344.1; 74/527; 74/535

(58) Field of Classification Search ............ 74/525, 74/526, 535–538; 248/419, 420, 423, 429, 248/430; 297/311, 344.1
See application file for complete search history.

(56) References Cited

U.S. PATENT DOCUMENTS

| | | | |
|---|---|---|---|
| 4,189,957 A | | 2/1980 | Gedig et al. |
| 4,712,759 A | * | 12/1987 | Sugama et al. ............ 248/429 |
| 5,596,910 A | * | 1/1997 | Bauer et al. ............... 74/526 |
| 5,782,138 A | | 7/1998 | Groche |
| 5,918,846 A | * | 7/1999 | Garrido ..................... 248/429 |
| 6,354,553 B1 | * | 3/2002 | Lagerweij et al. .......... 248/430 |

(Continued)

FOREIGN PATENT DOCUMENTS

| | | |
|---|---|---|
| EP | 408932 B1 | 6/1990 |
| EP | 1316466 A1 | 10/2002 |

*Primary Examiner*—Richard W Ridley
*Assistant Examiner*—Thomas Diaz
(74) *Attorney, Agent, or Firm*—McCarter & English, LLP

(57) ABSTRACT

A catch device of a lengthwise adjustment mechanism of a motor vehicle seat comprises a first pair of rails and a second pair of rails, each having a bottom rail and a seat rail. A first detent ledge is associated with the bottom rail and comprises first detent openings and first detent webs. A first stopper unit is disposed in proximity to the first detent ledge and cooperates therewith, comprises two stopper teeth for engaging the first detent openings independently of one another and for disengaging therefrom together and is associated with the seat rail of the first pair of rails. A second detent ledge is associated with the bottom rail of the second pair of rails and comprises second detent openings and second detent webs. A second stopper unit is disposed in proximity to the second detent ledge and cooperates therewith, comprises a stopper means for engaging and disengaging the second detent openings and is associated with the seat rail of the second pair of rails. An actuation unit has a hand lever and comprises actuator means through which the hand lever is connected to the two stopper units for common actuation of the stopper units. The second stopper unit has only one stopper means, which is a coherent part and is either in or out of engagement with at least one second detent opening.

19 Claims, 2 Drawing Sheets

U.S. PATENT DOCUMENTS

| | | | |
|---|---|---|---|
| 6,637,712 B1 * | 10/2003 | Lagerweij | 248/429 |
| 7,082,854 B2 * | 8/2006 | Goodbred et al. | 74/527 |
| 2003/0006355 A1 * | 1/2003 | Horsfield et al. | 248/429 |
| 2003/0085330 A1 * | 5/2003 | Lee | 248/430 |
| 2003/0230696 A1 * | 12/2003 | Yamada et al. | 248/424 |
| 2004/0026975 A1 * | 2/2004 | Rausch et al. | 297/344.1 |

* cited by examiner

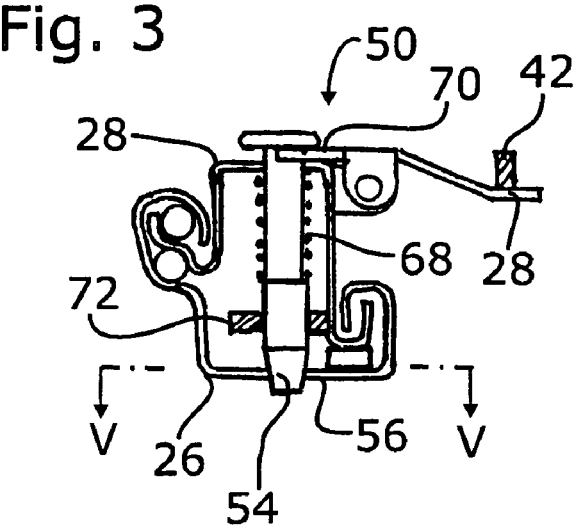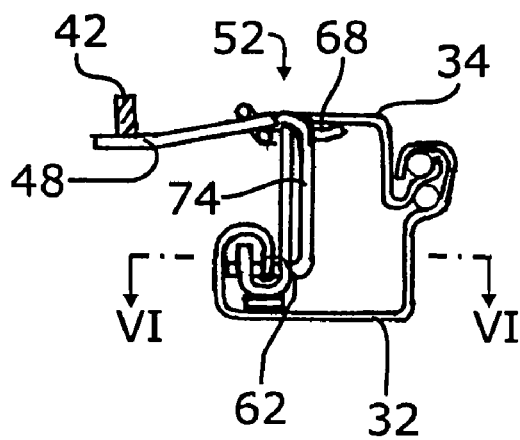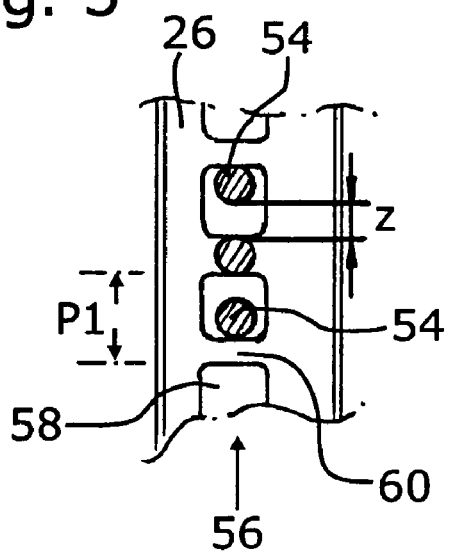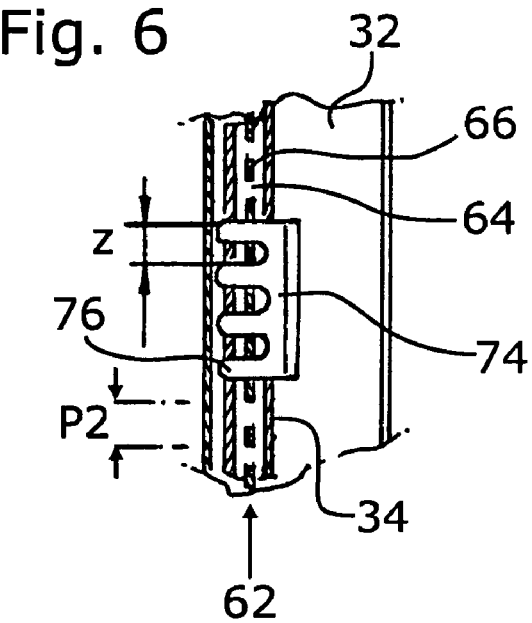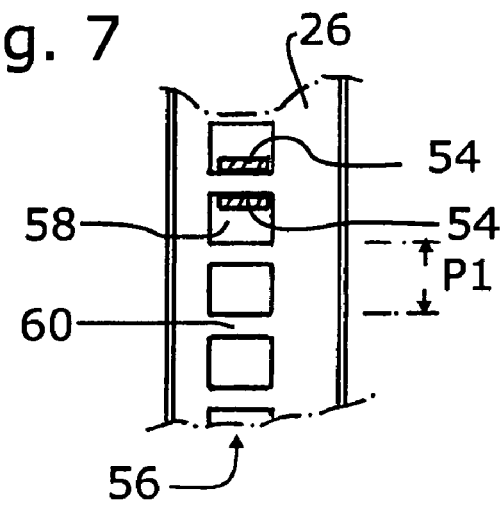

CATCH DEVICE OF A LENGTHWISE ADJUSTMENT MECHANISM OF A MOTOR VEHICLE SEAT WITH TWO PAIRS OF RAILS

CROSS REFERENCE TO RELATED APPLICATIONS

This application claims priority to German Application No. DE 10 2005 051 726.9, filed Oct. 27, 2005, the contents of which are expressly incorporated by reference in their entirety as part of the present disclosure.

BACKGROUND

The invention relates to a catch device of a lengthwise adjustment mechanism of a motor vehicle seat. Such a catch device is also called locking device and is known in prior art from EP 408 932 B1. The first stopper unit thereby has more than one stopper tooth, each stopper tooth being biased in the detent position by an elastic means. All the stopper teeth can come free via a common disengagement device. This stopper unit has the advantage that at least one stopper tooth always engages a first detent opening, irrespective of the relative position between the first stopper unit and the first detent ledge. This allows achieving a safety lock in any case. Such a safety lock does not always provide a zero clearance fit. In order to achieve a zero clearance lock, at least one additional stopper tooth must engage. Such type catch devices are also known from EP 1 316 466 A1, U.S. Pat. Nos. 4,189,957 and 5,782,138.

In the catch device of the type mentioned herein above, the two stopper units are built identically, each being configured as described in conjunction with the first stopper unit. Such type stopper units mostly work continuously, they are referred to as multiple pin locks and have proved markedly efficient, although they are more complex than the stopper units having but one stopper means, which is actuated as a whole during engaging and disengaging. The latter stopper means need but one single elastic means, which biases them into the stop position. The provisions for disengagement are also simpler; the stopper means can be connected directly, without slip coupling, to the actuation lever.

A catch device of a motor vehicle seat is a security-relevant part. If a catch device is not locked or if it is locked incorrectly, the occupant may be seriously injured in the event of an accident. This applies in particular to safety belts fastened on the seat. On the usually used three-point seat belt, there is provided a latch lock system that is located on the inboard side of the front seat and is connected to the vehicle seat, for example to the seat rail.

The purpose of the invention is to keep as far as possible the advantages of the continuous stopper units described in the catch device described herein above while reducing expense and costs of a catch device.

In view thereof, the object of the invention is to develop the catch device of the type mentioned herein above in such a manner that the dependability of the catch is largely preserved, with the catch device however being of simpler construction, needing less parts and being low in cost as well.

SUMMARY

In view of the catch device of the type mentioned herein above, the object is solved by providing an adjustment mechanism comprises a first pair of rails and a second pair of rails, each having a bottom rail and a seat rail, and a catch device. The catch device comprises a first detent ledge that is associated with the bottom rail of the first pair of rails and comprises first detent openings and first detent webs; a first stopper unit, also called first locking unit, that is disposed in proximity to the first detent ledge and cooperates therewith, that comprises two stopper teeth for engaging the first detent openings independently of one another and for disengaging therefrom together and that is associated with the seat rail of the first pair of rails; a second detent ledge that is associated with the bottom rail of the second pair of rails and that comprises second detent openings and second detent webs; a second stopper unit, also called second locking unit, that is disposed in proximity to the second detent ledge and cooperates therewith, that comprises a stopper means for engaging and disengaging the second detent openings and that is associated with the seat rail of the second pair of rails; and an actuation unit that has a hand lever and comprises actuator means through which the hand lever is connected to the two stopper units for common actuation of the stopper units.

Furthermore, the second stopper unit has only one stopper means, which is a coherent part and that is either in or out of engagement with at least one second detent opening.

In this catch device, the two stopper units are built differently from each other. Whilst the first stopper unit is built as a continuous stopper unit with at least two discrete stopper teeth, the second stopper unit is equipped with only one stopper means, meaning, it is not continuous, which is to say that it does not engage in each relative position between the stopper means and the second detent ledge. Since however the first stopper unit engages in any relative position, the vehicle seat equipped with the catch device of the invention is in any case safety locked after each locking event. If a relative movement occurs, for example because of an acceleration of the vehicle, at least one additional stopper tooth of the first stopper unit engages so that the first stopper unit assumes a position in which it provides full stop, with the second stopper unit also engaging on its own at need, its stopper means cooperating with at least one second detent opening. Further, the second stopper unit has only one stopper means, which is a coherent part and that is either in or out of engagement with at least one second detent opening.

The detent openings are arranged periodically. The period size P1 on the first detent ledge is an integer multiple of the period size P2 of the second detent ledge. This makes it possible to design the two different stopper units in such a manner that they stop at the same sites.

The catch device also has the advantage that the force felt at the hand lever while releasing the lock makes less jumps or steps during shifting than with the prior art catch device. Jumps occur when not completely engaged stopper teeth of a first stopper unit are pulled to come free. On the second stopper unit, no jump occurs since here the stopper means must always be completely moved from the stopping position into the release position. With a multiple pin lock as it is provided in the first stopper unit, jumps may occur for the third, fourth stopper tooth and so on.

BRIEF DESCRIPTION OF THE DRAWINGS

Other features and advantages of the invention will become apparent upon reviewing the other claims and the following non restrictive description of embodiments of the invention, given by way of example only with reference to the drawing. In the drawing:

FIG. 3 shows an end view of a first pair of rails with a first detent device and an associated first detent ledge;

FIG. 4 shows an end view like FIG. 3, now showing a second pair of rails with the second stopper unit and the associated second detent ledge;

FIG. 5 shows a sectional view taken along section line V-V of FIG. 3;

FIG. 6 shows a sectional view taken along section line VI-VI of FIG. 4; and

FIG. 7 shows a sectional view like FIG. 5 but now for a first stopper unit with two stopper teeth.

DETAILED DESCRIPTION

The FIGS. 1 through 6 show a first exemplary embodiment of the catch device, FIG. 7 shows a second exemplary embodiment.

Figure 1:
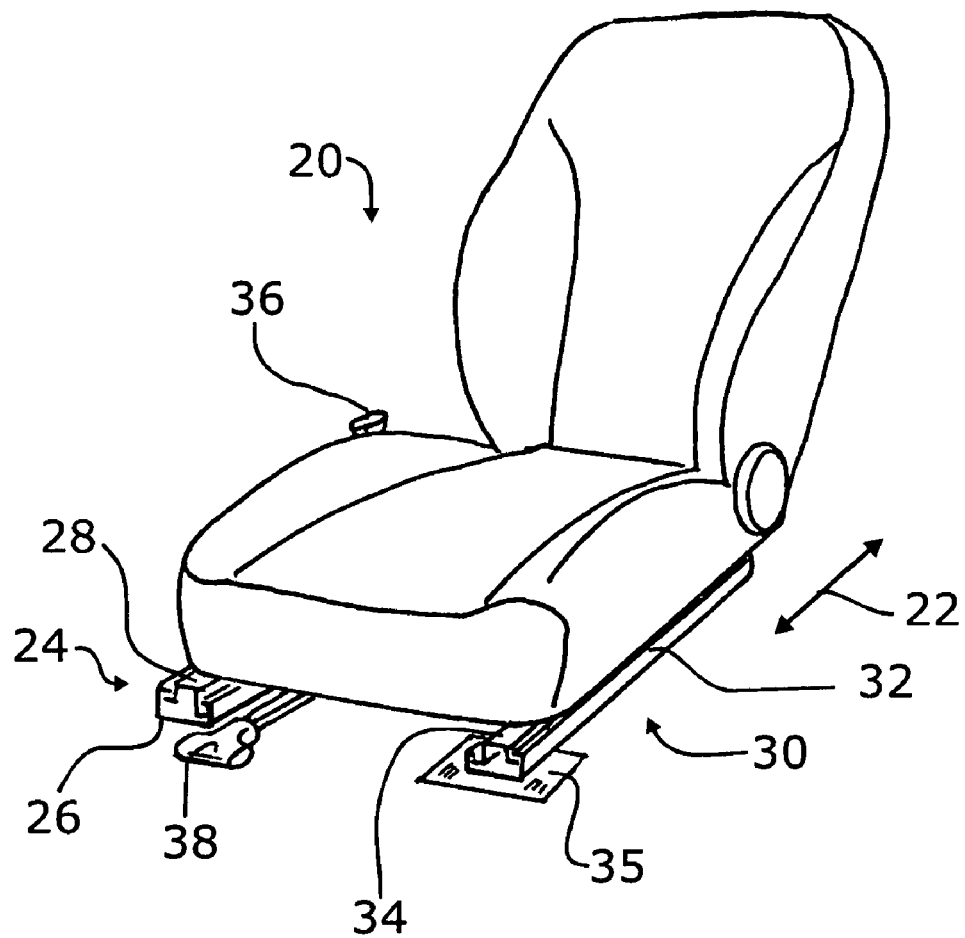
FIG. 1 shows a perspective view of a motor vehicle seat.

FIG. 1 shows a vehicle seat 20 that is for example a vehicle seat or a passenger front seat. It can be adjusted lengthwise in a longitudinal direction 22, a lengthwise adjustment mechanism being provided for this purpose. The mechanism has a first pair of rails 24 with a first bottom rail 26 and a first seat rail 28 as well as a second pair of rails 30 with a second bottom rail 32 and a second seat rail 34. As can be seen from the Figs., the profiles of the rails 28 through 34 on either seat side largely coincide, the only differences concerning parts which are incorporated in, or mounted on the pairs of rails 24, 26. The two bottom rails 26, 32 of the longitudinal guide are fastened to an underbody 35. The first pair of rails 24 is located on the right seat side where there is also located a lock 36 of a three-point safety belt that has not been illustrated herein.

Figure 2:
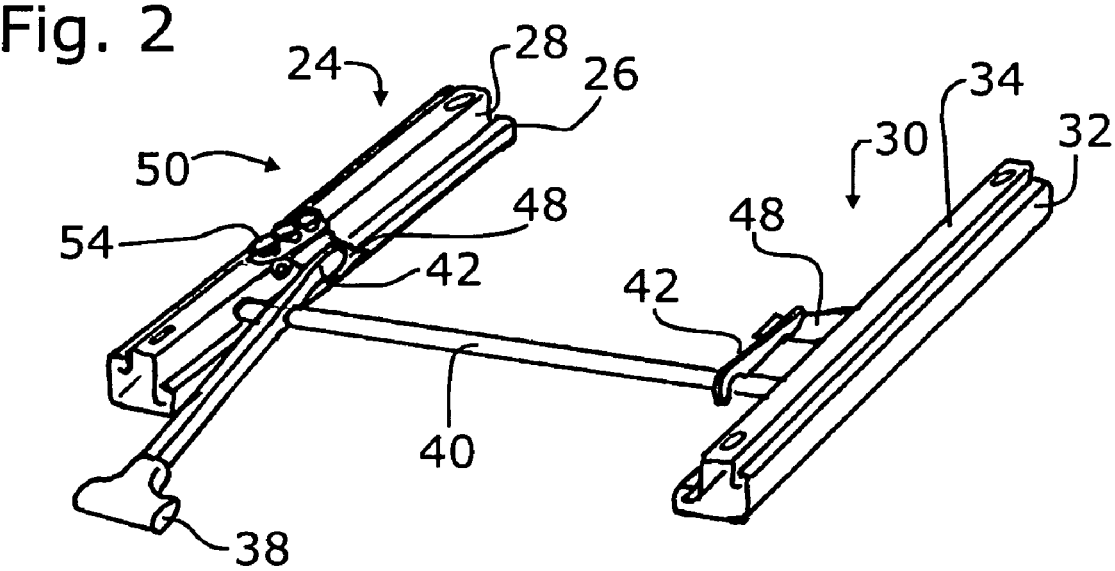
FIG. 2 shows a perspective representation of a catch device and of two pairs of rails.

The catch device has a hand lever 38 that is connected to a pivotally carried tie bar 40 connecting the two seat rails 30 and 34. Actuation means in the form of actuation arms 42, which are resting on disengagement levers 48, are connected to the tie bar 40. Each of these levers belong to stopper units, namely to a first stopper unit 50 and to a second stopper unit 52. In FIG. 2, only the first stopper unit 50 can be seen, it is configured to be a multiple pin locking unit. Three stopper teeth 54 can be seen. The second stopper unit is substantially housed in the interior cavity.

The stopper units 50, 52 are respectively connected to the associated seat rail 28, 34. For this purpose, openings or bearing means are provided in the seat rail. Each stopper unit 50, 52 cooperates with a detent ledge that is associated with the respective stopper unit. A first detent ledge 56 is provided for the first stopper unit 50, it has first detent openings 58 and first detent webs 60. A second detent web 62 is provided for the second stopper unit 52, it has second detent openings 64 and second detent webs 66. The first detent ledge 56 is formed by a bottom web of the profile of the first bottom rail 26. The second detent ledge 62 is formed by a free end of a U-shaped profile of the second bottom rail 32, in which substantially rectangular bight portions are cut, forming the second detent openings 64. Therein between webs remain, which form the second detent webs 66.

Every single stopper tooth 54 of the first stopper unit 50 is biased in the engagement position in which the stopper tooth 54 is shown in FIG. 3 by an elastic means 68 in the form of a helical compression spring. All the stopper teeth 54 can be pulled all together to come free against the force of the respective one of the elastic means, a disengagement comb 70 being provided, which is connected to the associated disengagement lever 48 and can be pivoted together therewith. As shown in FIG. 3, the discrete stopper teeth 54 extend through openings in a sheared metal sheet 72.

The disengagement lever 48 of the second stopper unit 52 integrally merges into a stopper means 74 that has four comb-like arranged stopper projections 76 which cooperate with the second detent openings 64, see FIG. 6. Like in FIG. 4, the locked condition is shown. In a U-shaped profile of the second seat rail 34 there are provided perforations through which the stopper means 74 extends; they have the same function as the sheared metal sheet 72 described.

In the Figure Sheet 2/2, the FIGS. 3 and 4 as well as the FIGS. 5 and 6 are positioned with respect to one another like in a mounted vehicle seat. The FIGS. 5 and 6 in particular show how the stopper units 50, 52 are confronting each other. In the exemplary embodiment shown, the stopper means 74 is made from one piece. It may also be made from a plurality of pieces that are rigidly connected together. Out of question is an implementation in which the stopper projections 76 are movable independent of each other. If the stopper means 74 is described as being an coherent part, this is to be understood in such a way that the stopper projections 76 can only be moved together and that, mechanically speaking, they are preferably rigidly joined together.

The two stopper units 50, 52 are matched in such a manner that the two actuation arms 42 must describe the same downward path in order for them to move the stopper teeth 54 or the stopper means 74 into the release position. If however the actuation arms 42 do not have the same length but different lengths instead, a transmission ratio can be achieved so that the actuation paths of the two stopper units 50, 52 can be different. The detent ledges 56, 58 are periodic, with the respective detent openings 58, 64 and the detent webs 60, 66 having a periodic arrangement. The period size of the first detent ledge 56 is P1, the period size of the second detent ledge 62 is P2. In the first exemplary embodiment, three stopper teeth 54 are provided, which are equally spaced in the longitudinal direction 22. The clear distance between two neighboring stopper teeth 54 has the value z. The value z is the spacing between two stopper projections 76. The period size P2 has the same value.

In the exemplary embodiments, the respective detent openings and detent webs of each detent ledge are built identically. It is possible to build a detent ledge with alternating short and long detent openings, such a detent ledge also having a period. Basically, all the spacings between the stopper teeth 54 and the stopper projections 56 that have been described can be enlarged by m times the respective period size, with m being a natural number.

In the exemplary embodiment of FIG. 7, only two stopper teeth 54 are provided instead of three. Regarding the geometry, the reader is more specifically referred to the already mentioned U.S. Pat. No. 4,189,957. In this document, he will also find the formulae for the spacing between the two stopper teeth 54, their width, the arrangement of the first detent opening 58 and of the detent webs 60. Now, the period size P1 is smaller than in the implementation of FIG. 5, it now only is double, instead of triple, the period size P2.

The free ends of the stopper teeth 54 may be bevelled, as shown in FIG. 3 by a conical point. This allows for locked conditions at these bevels, such conditions being shown e.g., in EP 4 089 32 B1. In such locking conditions, the two detent openings 64 on the other seat side are not exactly opposite the stopper means 74. However, the vehicle seat has certain elasticity. As a result, a certain offset between the locking positions of the two seat sides is admissible. It may for example be of at least one millimeter.

What is claimed is:

1. A safety lock catch device of a lengthwise adjustment mechanism of a motor vehicle seat, the lengthwise adjustment mechanism comprising a first pair of rails and a second pair of rails, each having a bottom rail and a seat rail; and the catch device comprising:

a first detent ledge that is associated with the bottom rail of the first pair of rails and comprises first detent openings and first detent webs, a first stopper unit that is disposed in proximity to the first detent ledge and cooperates therewith, that comprises at least two stopper teeth for engaging the first detent openings independently of one another and for disengaging therefrom together and that is associated with the seat rail of the first pair of rails, a second detent ledge that is associated with the bottom rail of the second pair of rails and that comprises second detent openings and second detent webs, a second stopper unit that is disposed in proximity to the second detent ledge and cooperates therewith, that comprises only one stopper part that engages and disengages the second detent openings and that is associated with the seat rail of the second pair of rails, and an actuation unit that has a hand lever and comprises actuator means through which the hand lever is connected to the two stopper units for common actuation of the stopper units, wherein the stopper part is a coherent part and that is either in or out of engagement with at least one second detent opening.

2. The safety lock catch device of claim 1, wherein the spacing between two neighbouring second detent openings has the value z and that the clear distance between two neighbouring stopper teeth of the first stopper unit also has the value z.

3. The safety lock catch device of claim 1, wherein the length of a first detent opening is double the length of a first detent web.

4. The safety lock catch device of claim 1, wherein the width of a stopper tooth of the first stopper unit equals the length of a first detent web.

5. The safety lock catch device of claim 1, wherein the stopper teeth of the first stopper unit are all built identically.

6. The safety lock catch device of claim 1, wherein the first stopper unit is located on the side of the motor vehicle seat to which higher belt forces are applied as compared to the other seat side.

7. The safety lock catch device of claim 1, wherein the motor vehicle seat is a driver's seat or a passenger front seat and that the first stopper unit is located on the inboard side of the seat.

8. The safety lock catch device of claim 1, wherein the first stopper unit comprises at least three stopper teeth.

9. The safety lock catch device of claim 1, wherein the first stopper unit comprises three stopper teeth.

10. The safety lock catch device of claim 1, wherein the stopper part of the second stopper unit is configured to be a stopper comb which has at least two stopper projections.

11. The safety lock catch device of claim 1, wherein the stopper part of the second stopper unit is an integral part.

12. The safety lock catch device of claim 1, wherein the stopper part of the second stopper unit is a rigid part.

13. The safety lock catch device of claim 1, wherein the stopper part comprises at least two stopper projections, and wherein all of the stopper projections are either in or out of engagement with the at least one second detent opening.

14. The safety lock catch device of claim 1, wherein the stopper part has a different configuration than a stopper tooth of the at least two stopper teeth and from the at least two stopper teeth.

15. The safety lock catch device of claim 1, wherein at least one of the at least two stopper teeth is engaged with one of the first detent openings in any lengthwise adjustment position of the motor vehicle seat.

16. A safety lock catch device of a lengthwise adjustment mechanism of a motor vehicle seat, the lengthwise adjustment mechanism comprising a first pair of rails and a second pair of rails, each having a bottom rail and a seat rail; and the catch device comprising:

a first detent ledge that is associated with the bottom rail of the first pair of rails and comprises first detent openings and first detent webs, a first stopper unit that is disposed in proximity to the first detent ledge and cooperates therewith, that comprises at least two stopper teeth for engaging the first detent openings independently of one another and for disengaging therefrom together and that is associated with the seat rail of the first pair of rails, a second detent ledge that is associated with the bottom rail of the second pair of rails and that comprises second detent openings and second detent webs, a second stopper unit that is disposed in proximity to the second detent ledge and cooperates therewith, that comprises only one stopper part that engages and disengages the second detent openings and that is associated with the seat rail of the second pair of rails, the stopper part is a coherent part and is either in or out of engagement with at least one second detent opening, an actuation unit that has a hand lever and comprises actuator means through which the hand lever is connected to the two stopper units for common actuation of the stopper units, wherein the first detent ledge has a period size P1, the second detent ledge has a period size P2, and the period size P1 of the first detent ledge is n-times the period of the period size P2 of the second detent ledge, whereby n is an integer.

17. A safety lock catch device of a lengthwise adjustment mechanism of a motor vehicle seat, the lengthwise adjustment mechanism comprising a first pair of rails and a second pair of rails, each having a bottom rail and a seat rail; and the catch device comprising:

a first detent ledge that is associated with the bottom rail of the first pair of rails and comprises first detent openings and first detent webs, a first stopper unit that is disposed in proximity to the first detent ledge and cooperates therewith, that comprises at least two stopper teeth for engaging the first detent openings independently of one another and for disengaging therefrom together and that is associated with the seat rail of the first pair of rails, a second detent ledge that is associated with the bottom rail of the second pair of rails and that comprises second detent openings and second detent webs, a second stopper unit that is disposed in proximity to the second detent ledge and cooperates therewith, that comprises only one stopper part that engages and disengages the second detent openings and that is associated with the seat rail of the second pair of rails, the stopper part is a coherent part and is either in or out of engagement with at least one second detent opening, an actuation unit that has a hand lever and comprises actuator means through which the hand lever is connected to the two stopper units for common actuation of the stopper units, wherein the second detent ledge has a period size $P2$, and the period size $P2$ of the second detent ledge corresponds to the clear distance between two neighboring stopper teeth of the first stopper unit.

18. A safety lock catch device of a lengthwise adjustment mechanism of a motor vehicle seat, the lengthwise adjustment mechanism comprising a first pair of rails and a second pair of rails, each having a bottom rail and a seat rail; and the catch device comprising:

a first detent ledge that is associated with the bottom rail of the first pair of rails and comprises first detent openings and first detent webs, a first stopper unit that is disposed in proximity to the first detent ledge and cooperates therewith, that comprises at least two stopper teeth for engaging the first detent openings independently of one another and for disengaging therefrom together and that is associated with the seat rail of the first pair of rails, a second detent ledge that is associated with the bottom rail of the second pair of rails and that comprises second detent openings and second detent webs, a second stopper unit that is disposed in proximity to the second detent ledge and cooperates therewith, that comprises only one stopper part that engages and disengages the second detent openings and that is associated with the seat rail of the second pair of rails, the stopper part is either in or out of engagement with at least one second detent opening, an actuation unit that has a hand lever and comprises actuator means through which the hand lever is connected to the two stopper units for common actuation of the stopper units, wherein the first stopper unit has a different configuration than the second stopper unit.

19. The safety lock catch device of claim 18, wherein the stopper part has a different configuration than a stopper tooth of the at least two stopper teeth.

* * * * *